(12) United States Patent
Staghøj et al.

(10) Patent No.: US 9,362,787 B2
(45) Date of Patent: Jun. 7, 2016

(54) WIND TURBINE GENERATOR WITH MOVABLE STATOR SUBUNITS

(75) Inventors: Michael Staghøj, Ry (DK); Gerner Larsen, Hinnerup (DK); Niels Christian Olsen, Tjele (DK); Frank Møller Hansen, Arden (DK)

(73) Assignee: Vestas Wind Systems A/S, Aarhus N. (DK)

( * ) Notice: Subject to any disclaimer, the term of this patent is extended or adjusted under 35 U.S.C. 154(b) by 363 days.

(21) Appl. No.: 13/978,318

(22) PCT Filed: Jan. 5, 2011

(86) PCT No.: PCT/EP2011/050082
§ 371 (c)(1),
(2), (4) Date: Jul. 3, 2013

(87) PCT Pub. No.: WO2012/092964
PCT Pub. Date: Jul. 12, 2012

(65) Prior Publication Data
US 2013/0285501 A1    Oct. 31, 2013

(51) Int. Cl.
*F03D 9/00*     (2016.01)
*H02K 1/18*     (2006.01)
(Continued)

(52) U.S. Cl.
CPC ................ *H02K 1/18* (2013.01); *H02K 1/148* (2013.01); *H02K 1/182* (2013.01); *H02K 7/08* (2013.01);
(Continued)

(58) Field of Classification Search
CPC ...... H02K 1/148; H02K 21/026; H02K 16/04
USPC ........................................................ 290/55
See application file for complete search history.

(56) References Cited

U.S. PATENT DOCUMENTS 4,289,970 A * 9/1981 Deibert ................. F03D 7/0224
                                                       290/44
6,018,208 A   1/2000 Maher
(Continued)

FOREIGN PATENT DOCUMENTS

WO        0106623 A1    1/2001
WO     2009093183 A2    7/2009

OTHER PUBLICATIONS

Office Action issued by the European Patent Office in corresponding European Application No. 11700020.8 on Jul. 21, 2014 (4 pages).
(Continued)

*Primary Examiner* — Hanh Nguyen
(74) *Attorney, Agent, or Firm* — Wood, Herron & Evans, LLP

(57) ABSTRACT

A generator (5) for a wind turbine (1) is disclosed. The generator (5) comprises a rotor (3) configured to rotate about a rotational axis, and at least one stator (4) arranged next to the rotor (3). Each stator (4) comprises at least two subunits (8), the subunits (8) being arranged side-by-side along a moving direction of the rotor (3). Each subunit (8) comprises at least one flux-generating module (9) facing the rotor (3) but spaced therefrom, thereby defining an air gap between the rotor (3) and each flux-generating module (9). The subunits (8) are movable relative to each other along a direction which is substantially transverse to the moving direction of the rotor (3). This allows a subunit (8) to move in a manner which adjusts the air gap without affecting the position and the air gap of a neighboring subunit (8). Thereby variations in the rotor (3) can be compensated and a uniform and constant air gap can be maintained. The invention further provides a wind turbine (1) comprising such a generator (5) and a method for performing service on a generator (5).

16 Claims, 5 Drawing Sheets

(51) Int. Cl.
*H02K 1/14* (2006.01)
*H02K 7/08* (2006.01)
*H02K 15/00* (2006.01)
*H02K 21/02* (2006.01)
*H02K 7/18* (2006.01)
*H02K 16/04* (2006.01)
*F16C 32/06* (2006.01)

(52) U.S. Cl.
CPC .......... *H02K 7/1869* (2013.01); *H02K 15/0006* (2013.01); *H02K 21/026* (2013.01); *F16C 32/0614* (2013.01); *F16C 32/0685* (2013.01); *H02K 16/04* (2013.01)

(56) References Cited

U.S. PATENT DOCUMENTS

| | | | | |
|---|---|---|---|---|
| 6,064,123 | A * | 5/2000 | Gislason | F03D 9/002 290/44 |
| 8,174,142 | B2 * | 5/2012 | Barber | F03D 1/02 290/44 |
| 8,598,731 | B2 * | 12/2013 | Pitre | F03D 3/061 290/55 |
| 8,674,538 | B2 * | 3/2014 | Lugg | F03D 1/025 290/44 |
| 2008/0067965 | A1 | 3/2008 | Bailey | |
| 2008/0309189 | A1 | 12/2008 | Pabst | |
| 2012/0112465 | A1 * | 5/2012 | Morrison | F03D 9/002 290/55 |

OTHER PUBLICATIONS

International Searching Authority, Search Report and Written Opinion issued in corresponding International No. PCT/EP2011/050082 dated Feb. 28, 2012, 18 pages.

* cited by examiner

WIND TURBINE GENERATOR WITH MOVABLE STATOR SUBUNITS

FIELD OF THE INVENTION

The present invention relates to a generator for a wind turbine. The generator of the invention allows an air gap between a rotor and a stator of the generator to be controlled accurately, even for large diameter rotors and stators. The present invention further relates to a wind turbine comprising such a generator, and to a method for performing service on such a generator.

BACKGROUND OF THE INVENTION

Generators normally comprise a rotor and a stator, the rotor being arranged rotatably relative to the stator with a small air gap there between. It is necessary to achieve and maintain a high precision in the air gap between the rotor and the stator since the air gap, also for very large generators, has to be quite small, and generally only a few millimeters. To this end the rotor and the stator have previously been designed very rigid and heavy.

US 2010/0007225 A1 discloses a generator or motor apparatus having a stator formed from a plurality of pairs of parallel stator segments. The pairs of parallel segments are connected together to form a channel in which an annular rotor moves. The annular rotor also comprises a plurality of detachable segments connected together to form an annular tram operable to move through the channel. Each stator segment comprises a stator winding set, and each rotor segment comprises a magnet dimensioned to fit between the parallel spaced apart stator segments. Variations in AC outputs may be minimised by connecting stator segments in parallel to each other. As a given rotor segment passes the stator segments of a given pair, any mechanical deviation from centre in which the given rotor segment is distant from one stator segment of the given pair is matched by the given rotor segment being correspondingly closer to the other stator segment of the given pair.

SUMMARY OF THE INVENTION

It is an object of embodiments of the invention to provide a generator for a wind turbine in which the size of an air gap between rotor and stators can be easily controlled.

It is a further object of embodiments of the invention to provide a wind turbine comprising a generator in which the size of an air gap between rotor and stators can be easily controlled.

It is an even further object of embodiments of the invention to provide a generator for a wind turbine which allows service to be easily performed on the generator.

According to a first aspect the invention provides a generator for a wind turbine, the generator comprising:
  a rotor configured to rotate about a rotational axis, and
  at least one stator arranged next to the rotor, each stator comprising at least two subunits, the subunits being arranged side-by-side along a moving direction of the rotor, each subunit comprising at least one flux-generating module facing the rotor but spaced therefrom,
wherein the subunits are movable relative to each other along a direction which is substantially transverse to the moving direction of the rotor.

The rotor is configured to rotate about a rotational axis, and the stator(s) is/are arranged next to the rotor. Accordingly, when the rotor rotates about the rotational axis, it performs rotational movements relative to the stator(s), and thereby relative to the flux-generating modules. This relative movement causes electrical energy to be produced by the generator.

The flux-generating modules are arranged in such a manner that they face the rotor, but are spaced therefrom. This forms an air gap between the rotor and the flux-generating modules. The rotor and the flux-generating modules of the stator include permanent magnets, electromagnetic windings, combinations thereof, or other active materials configured to provide a magnetic flux across the air gap sufficient to generate electricity.

Each stator comprises at least two subunits. The subunits are arranged side-by-side along a moving direction of the rotor, i.e. along the direction in which the rotor passes the stator(s) when it rotates about the rotational axis. Accordingly, during rotation of the rotor, a given part of the rotor will first pass a first subunit, and the flux-generating module(s) thereof, and subsequently a second subunit, and the flux-generating module(s) thereof.

The subunits are movable relative to each other along a direction which is substantially transverse to the moving direction of the rotor. Thus, the subunits are individually movable in a direction towards and away from the rotor. Accordingly, when the rotor passes through a given stator, the distance between the rotor and a given subunit of the stator may change without affecting the distance between the rotor and a neighbouring subunit. This makes it possible to compensate for small irregularities in the rotor, thereby maintaining a substantially constant air gap between the rotor and the flux-generating modules. Accordingly, undesirable fluctuations in the power production of the generator are avoided.

Each subunit may comprise a first flux-generating module and a second flux-generating module arranged on opposing sides of the rotor. According to this embodiment, at least one set of flux-generating modules is arranged opposite to each other with the rotor rotating in a channel formed between the flux-generating modules. An air gap is formed between the rotor and the first flux-generating module, as well as between the rotor and the second flux-generating module.

The first flux-generating module and the second flux-generating module may be mounted on separate stator support parts, which in turn are mounted to a stator support structure. The stator support parts may also be connected to each other via a hinge connection. It should be noted that in the present context the term 'hinge connection' should be interpreted to mean a connection which allows mutual rotational movement of the two stator support parts (and, therefore, the flux-generating modules mounted thereon), the mutual rotational movement having only one degree of freedom. During normal operation of the generator, the stator support parts (and flux-generating modules mounted thereon) are preferably substantially fixed relative to each other in the sense that they are prevented from performing relative rotational movements via the hinge connection. This may be achieved, for example, by bolting the stator support parts to each other.

As described above, the hinge connection allows the flux-generating modules to perform relative rotational movements, even though the flux-generating modules are not directly connected to each other via the hinge connection. In particular, this allows one of the flux-generating modules to be rotated away from the other flux-generating module, via the hinge connection, making it possible to gain access to the region between the flux-generating modules, i.e. the region accommodating the rotor. This may be desirable for maintenance or service of the generator. Furthermore, it may be possible to fix one of the stator support parts to a neighbouring subunit or to a support during movements of the other stator support part from the same subunit via the hinge connection. As such, one of the flux-generating modules is kept immovable relative to the stator, while the other flux-generating module is moved via the associated stator support part and its hinge connection.

At least two subunits or two groups of subunits may define electrically separated subgenerators. Since the subgenerators are electrically separated, they are able to operate independent of each other. This provides the possibility of continuing power production at a reduced power level in the case of a breakdown of one of the subgenerators. In this case the subgenerator suffering a breakdown can be decoupled, while the remaining subgenerator(s) continue(s) producing power. Furthermore, in the case of reduced wind, one or more subgenerators can be switched off, thereby maintaining power production at a reduced power level by means of the remaining subgenerator(s).

The subunits may be passively movable relative to each other along the transverse direction, i.e. the relative movement along the transverse direction may be provided without the use of active means, such as actuators or the like.

Each subunit and/or each flux-generating module may be mounted on a stator support structure, in which case the relative movements of the subunits may be provided by flexibility of the stator support structures. A desired flexibility of the stator support structure may, e.g., be obtained by selecting an appropriate material and/or by carefully designing the shape, material thickness, etc. of the stator support structure, thereby obtaining a flexibility of the support structure which ensures that the subunits move relative to each other along the transverse direction in a desired manner. Thereby the size of the air gap defined between the rotor and the flux-generating modules can be controlled to be substantially uniform.

Each stator support structure may define a preloaded spring force acting against magnetic forces occurring between the rotor and the flux-generating modules during operation of the generator. According to this embodiment, the preloaded spring force ensures that any fluctuations in the size of the air gap, e.g. due to variations in the rotor, are counteracted, thereby ensuring that a substantially uniform air gap is maintained between the rotor and the flux-generating modules.

In the case that the flux-generating modules are mounted on separate stator support parts, the stator support parts may form part of the stator support structure. In this case, the stator support parts may, e.g., be mounted on a stator frame which also forms part of the stator support structure. According to this embodiment, the passive relative movements of the subunits may be provided by flexibility of the stator parts and/or by flexibility of the stator frame.

The stator support structure may, e.g., comprise a frame structure onto which two or more subunits are mounted. In this case a frame structure with the subunits mounted thereon may constitute a stator. Alternatively, a frame structure may be connected to one or more similar frame structures to form a stator, or the stator may comprise further structural parts. According to this embodiment, the flexibility providing the passive relative movements of the subunits along the transverse direction is at least partly provided by characteristics of the frame structure.

Alternatively or additionally, the stator support structure may form part of the subunits, or the subunits may form part of the stator support structure, in which case the flexibility providing the passive relative movements of the subunits along the transverse direction is at least partly provided by characteristics of the subunits.

The generator may comprise at least two stators arranged along separate angular segments of the rotor. According to this embodiment, the stators are arranged in such a manner that only part of the rotor is arranged adjacent to a stator at any given time, i.e. the stators do not occupy the entire periphery defined by the rotor.

The separate angular segments are preferably distributed substantially uniformly along the periphery defined by the rotor, and the stators preferably occupy angular segments of substantially equal size. For instance, the generator may comprise two stators arranged substantially opposite to each other, e.g. each occupying an angular segment of approximately 60°. As an alternative, the generator may comprise three stators arranged with approximately 120° between neighbouring stator segments, or the generator may comprise any other suitable or desirable number of stators.

As an alternative, the generator may comprise a single stator arranged along the entire periphery of the rotor, i.e. the stator extending along 360°. As another alternative, a single stator may extend along a smaller angular part of the periphery defined by the rotor.

The generator may be an axial flux generator with an air gap between the flux-generating modules and the rotor extending substantially parallel to the rotational axis of the rotor. Thereby the flux lines generated as the rotor moves past the flux-generating modules also extend substantially parallel to the rotational axis of the rotor. Accordingly, the forces acting between the rotor and the stators also extend substantially parallel to the rotational axis of the rotor, thereby minimising forces acting substantially perpendicularly to the rotational axis. This reduces the loads introduced in the generator.

Alternatively, the generator may be a radial flux generator with an air gap between the flux-generating modules and the rotor extending substantially perpendicular to the rotational axis of the rotor.

According to a second aspect the invention provides a wind turbine comprising at least one generator according to the first aspect of the invention.

The wind turbine may comprise two generators according to the first aspect of the invention, the rotors of said generators being mounted on a common rotational shaft. According to this embodiment, the generators may, e.g., be mounted on opposite sides of a tower construction carrying the generators. Thereby the power production of the wind turbine can be significantly increased, possibly doubled, as compared to a wind turbine comprising only one generator.

The rotor(s) of the generator(s) may be connected to a set of wind turbine blades, i.e. the rotational movements of the rotor(s) may be a result of the wind acting on the wind turbine blades.

The wind turbine may be a horizontal axis wind turbine, i.e. it may be of a kind having a set of wind turbine blades mounted on or connected to a main axle arranged rotationally, and extending along a substantially horizontal direction.

As an alternative, the wind turbine may be a vertical axis wind turbine, i.e. it may be of a kind having a set of wind turbine blades mounted on or connected to a main axle arranged rotationally, and extending along a substantially vertical direction.

The generator may be a direct drive generator, or a gearless generator. According to this embodiment, the rotor is driven directly by the wind turbine blades, i.e. the wind acting on the wind turbine blades directly provides the relative movements between the rotor and the stators without the use of a gear stage. As an alternative, the wind turbine may comprise a gear system arranged between the wind turbine blades and the rotor of the generator. The gear system normally increases the rotational speed, i.e. the rotational speed of an input shaft of the generator is higher than the rotational speed of a main axle coupled to and driven by the wind turbine blades.

According to a third aspect the invention provides a method of performing service on a generator of a wind turbine, the generator comprising a rotor configured to rotate about a rotational axis, and at least one stator arranged next to the rotor, each stator comprising at least two subunits, the subunits being arranged side-by-side along a moving direction of the rotor, each subunit comprising a first flux-generating module and a second flux-generating module arranged on opposing sides of the rotor and spaced therefrom, the first flux-generating module and the second flux-generating module of at least one subunit being connected to each other via a hinge connection, the method comprising the steps of:

fixating the first flux-generating module of a first subunit,
moving the second flux-generating module of the first subunit relatively to the first flux-generating module, via the hinge connection, thereby providing access to a region between the flux-generating modules and the rotor, and
performing service on the generator, via said provided access.

It should be noted that a person skilled in the art would readily recognise that any feature described in connection with the first aspect could also be combined with the second aspect or the third aspect, that any feature described in connection with the second aspect of the invention could also be combined with the first aspect or the third aspect, and that any feature described in connection with the third aspect of the invention could also be combined with the first aspect or the second aspect.

Again, the third aspect of the invention relates to a method of performing service on a generator of a wind turbine. The generator is preferably a generator according to the first aspect of the invention, of the kind where flux-generating modules of the stator are arranged on opposing sides of the rotor, the flux-generating modules being connected to each other via a hinge connection, e.g. a hinge connection between opposite stator support parts to which the flux-generating modules are mounted. The remarks set forth above with reference to the first aspect of the invention are therefore equally applicable here.

In the method according to the third aspect of the invention, the first flux-generating module of a first subunit is initially fixated. Thereby further movements of the first flux-generating module are prevented, and the position of the first flux-generating module is thereby controlled.

Next, the second flux-generating module of the first subunit is moved relative to the first flux-generating module, via the hinge connection. Thus, a swinging or rotating movement of the second flux-generating module is performed, while the first flux-generating module is kept immobilized. Thereby the second flux-generating module is moved away from the rotor and from the first flux-generating module. Moving the second flux-generating module in this manner introduces an opening at the position where the second flux-generating module is arranged during normal operation. Via this opening, access can be gained to a region between the flux-generating modules and the rotor, i.e. the region where the rotor moves during normal operation of the generator.

Finally, service is performed on the generator, via the provided access. Thus, it is possible to perform service on the flux-generating modules and on the rotor. This is possible because of the hinge connection between the flux-generating modules, which allows the second flux-generating module to be moved as described above, thereby providing access to the region between the flux-generating modules and the rotor.

The step of fixating the first flux-generating module may comprise fixating the first flux-generating module to a second subunit. The second subunit may advantageously be a neighbouring subunit. As an alternative, the first flux-generating module may be fixated to a support part. This has been described in detail above with reference to the first aspect of the invention.

The method may further comprise the step of releasing a connection between the first flux-generating module and the second flux-generating module, prior to the step of moving the second flux-generating module. During normal operation, the first flux-generating module and the second flux-generating module are preferably fixated relative to each other in order to maintain a substantially uniform air gap between the rotor and the flux-generating modules. Thus, during normal operation the flux-generating modules should not be allowed to move relative to each other via the hinge connection. Accordingly, in order to allow the second flux-generating module to move relatively to the first flux-generating module in the case that it is desired to perform service on the generator, it is necessary to release a connection which fixates the flux-generating modules relative to each other during normal operation.

The connection between the flux-generating modules may, e.g., be a simple bolt connection, or another suitable kind of connection.

BRIEF DESCRIPTION OF THE DRAWINGS

The invention will now be described in further detail with reference to the accompanying drawings in which.

DETAILED DESCRIPTION OF THE DRAWINGS

Figure 1:
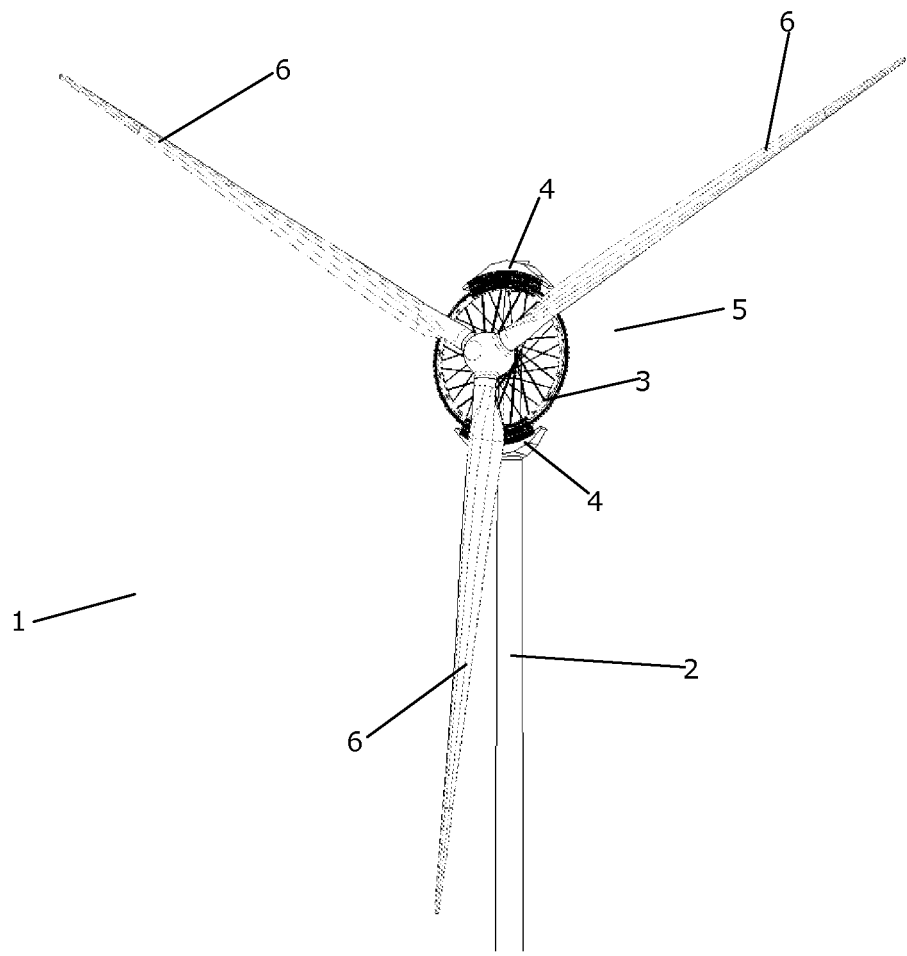
FIG. 1 is a perspective view of a wind turbine according to an embodiment of the invention.

FIG. 1 is a perspective view of a wind turbine 1 according to an embodiment of the invention. The wind turbine 1 comprises a wind turbine tower 2 having a rotor 3 and two stators 4 mounted thereon, the rotor 3 and the stators 4 forming part of a generator 5. Three wind turbine blades 6 are mounted on the rotor 3 in such a manner that the rotor 3 rotates relative to the stators 4 due to the wind acting on the wind turbine blades 6.

The wind turbine 1 is a direct drive wind turbine, i.e. the rotor 3 of the generator 5 is driven directly by the wind turbine blades 6 without a gear stage to increase rotational speeds.

The stators 4 are arranged substantially opposite to each other, each occupying an angular segment of approximately 60° along a periphery defined by the rotor 3. Although only two stators 4 are shown, an additional number of stators may be included in alternative embodiments.

Figure 2:
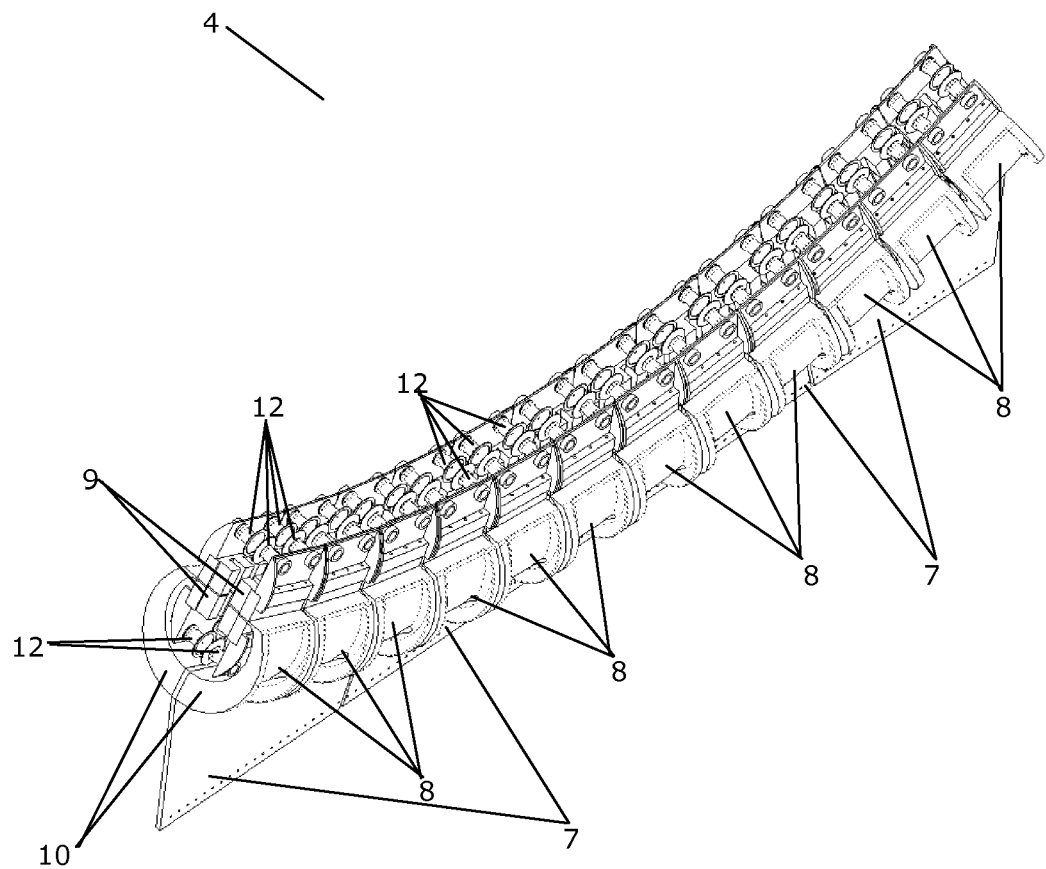
FIG. 2 is a perspective view of a stator of a generator according to an embodiment of the invention.

FIG. 2 is a perspective view of a stator 4 of a generator according to an embodiment of the invention. The stator 4 comprises four stator frames 7, each having three subunits 8 mounted thereon, the subunits 8 being arranged side-by-side. Each subunit 8 comprises two flux-generating modules 9 arranged opposite to and spaced from each other, thereby defining a passage there between, through which a rotor (not shown) can pass during normal operation of the generator. The rotor carries permanent magnets, electromagnets, or some other active material or component designed to interact with the flux-generating modules 9 to generate electric current. Specifically, an air gap is maintained between the rotor and each flux-generating module 9. As the active material of the rotor moves past the flux-generating modules 9, flux moves through the air gap. This moving flux induces a current in windings mounted near the flux-generating modules 9.

The flux-generating modules 9 are each mounted on a stator support part 10, and for each subunit 8, two stator support parts 10 are connected to each other via a hinge connection 11, thereby allowing the stator support parts 10 and flux-generating modules 9 mounted thereon to be moved relative to each other via the hinge connection 11. This will be described in further detail below with reference to FIG. 3.

The subunits 8 are mounted on the stator frame 7 in such a manner that they are movable relative to each other along a direction which is substantially transverse to the direction of movement of the rotor during normal operation of the generator, i.e. in a direction towards or away from the passage defined between the flux-generating modules 9. Thus, in the case that small irregularities are present in the rotor (e.g., due to deflections, machine tolerances, etc.), or other variations in the air gaps between the rotor and the flux-generating modules 9 occur, such irregularities or variations can be compensated by one subunit 8 moving slightly relative to a neighbouring subunit 8, without affecting the neighbouring subunit 8. Thereby it is possible to maintain a uniform and substantially constant air gap between the rotor 3 and each of the flux-generating modules 9. The transverse movements of the subunits 8 are provided passively due to inherent properties, such as material properties, geometric design, etc., of the stator frames 7 and/or the stator support parts 10. The stator frames 7 and the stator support parts 10 in combination form or form part of a stator support structure.

The stator frames 7 and/or the stator support parts 10 may define a preloaded spring force acting against magnetic forces occurring between the rotor and the flux-generating modules 9 during operation of the generator. In this case the preloaded spring force automatically ensures that any fluctuations in the air gap between the rotor and the flux-generating modules 9 is compensated, thereby helping in maintaining a uniform and constant air gap.

Each subunit 8 is further provided with eight bearing units. Although the bearing units 12 are shown in the form of air bearings, it will be appreciated that other types of bearings (e.g., roller bearings, slide bearings, hydrodynamic bearings, hydrostatic bearings, etc.) may be used instead of or in addition to air bearings. Additionally, the number and location of the bearing units 12 may vary. In FIG. 2, the bearing units 12 of each subunit are arranged above and below the flux-generating modules 9. Each bearing unit 12 includes a body defining a cavity with an open end facing the rotor. A source of pressurized fluid (not shown) is connected to each bearing unit 12, whose bodies direct the fluid against the rotor thereby creating a fluid film between the cavities and the rotor. The fluid film helps in maintaining a uniform air gap between the active material of the rotor and the flux-generating modules 9.

Figure 3:
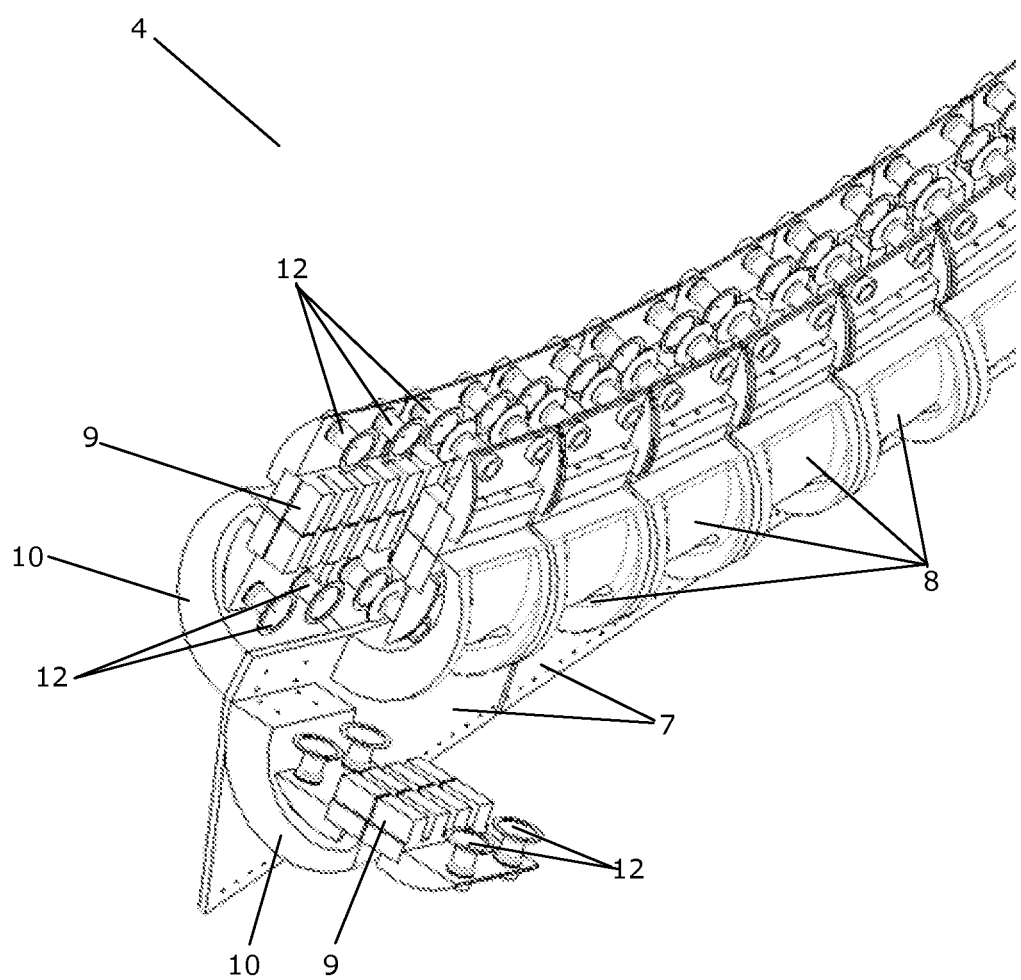
FIG. 3 shows a detail of the stator of FIG. 2.

FIG. 3 shows the stator 4 of FIG. 2 in further detail. In FIG. 3 one of the stator support parts 10 of one of the subunits 8 has been moved relative to the other stator support part 10 of that subunit 8, via the hinge connection 11. Thus, one of the stator support parts 10, and thereby the flux-generating modules 9 mounted thereon, has been rotated away from the passage through which the rotor passes during normal operation of the generator. Thereby it is possible to gain access to a region between the rotor and the flux-generating modules 9. This allows service to be easily performed on parts in this region of the generator, e.g. on the flux-generating modules 9, the bearing units 12 and/or the rotor.

A method for performing service on a generator comprising the stator 4 of FIGS. 2 and 3 may be performed in the following manner. Initially, one of the stator support parts 10 ("first" stator support part) is fixated independent of the other stator support part 10 in the same sub-unit 8 ("second" stator support part), e.g. by attaching the stator support part 10 to a neighbouring subunit 8, thereby preventing the stator support part 10 from moving via the hinge connection 11. Then the bolt connection (not shown) between the two stator support parts 10 of the subunit 8 is released, thereby allowing relative movement between the stator support parts 10. Subsequently, the second stator support part 10, along with the flux-generating module 9 mounted thereon, is moved via the hinge connection 11 to the position shown in FIG. 3. At this point it is possible to perform maintenance or service on the generator in the region between the rotor and the flux-generating modules 9, as described above. When the service has been completed, the second stator support part 10 is returned to the operating position shown in FIG. 2, via the hinge connection 11. The bolt connection between the stator support parts 10 is then re-established, and the fixation of the first stator support part 10 is released. Then the generator is once again ready for normal operation.

Figure 4:
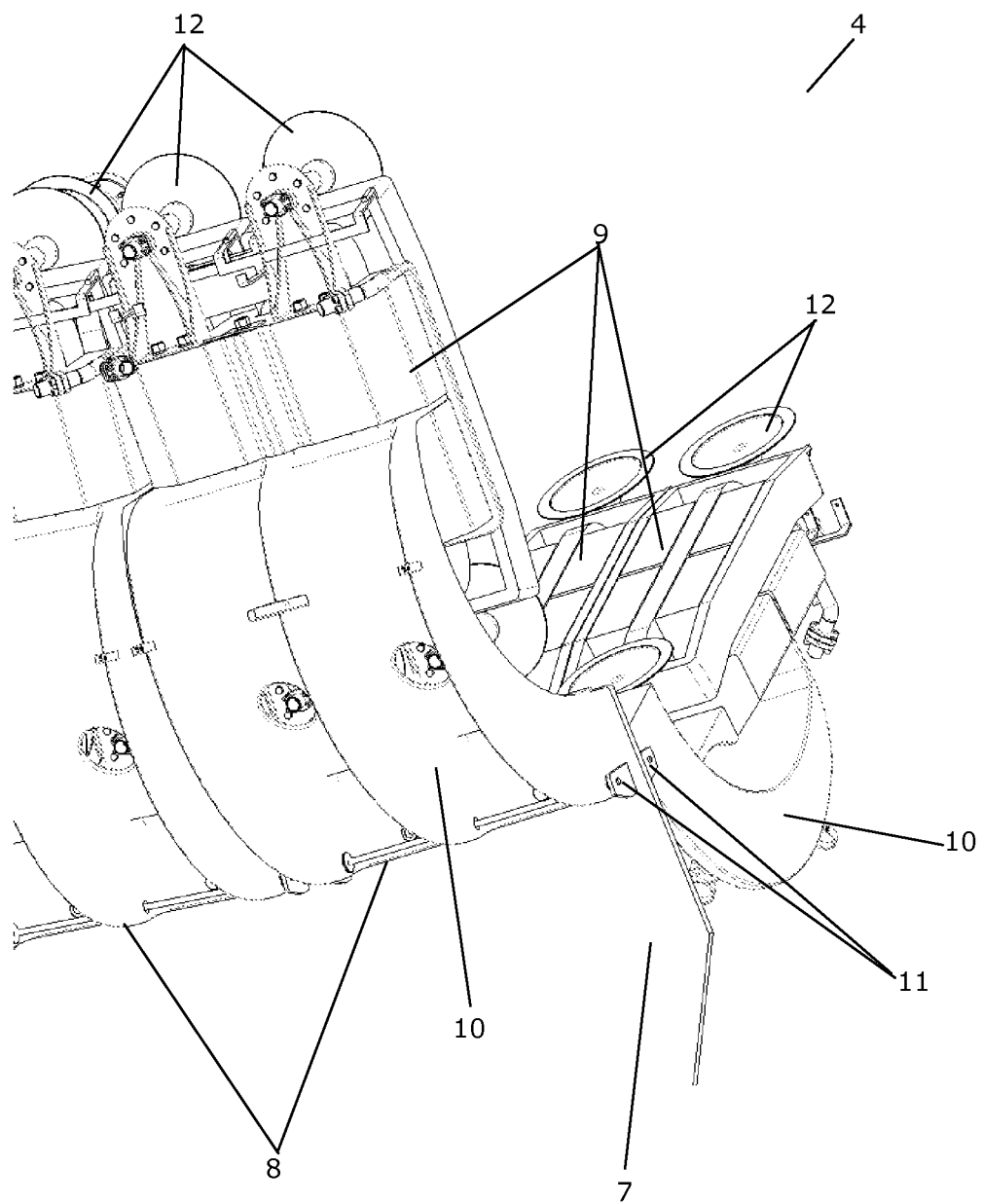
FIG. 4 shows another detail of the stator of FIG. 2.

FIG. 4 shows another detail of the stator 4 of FIG. 2. In FIG. 4 the hinge connection 11 is visible.

Figure 5:
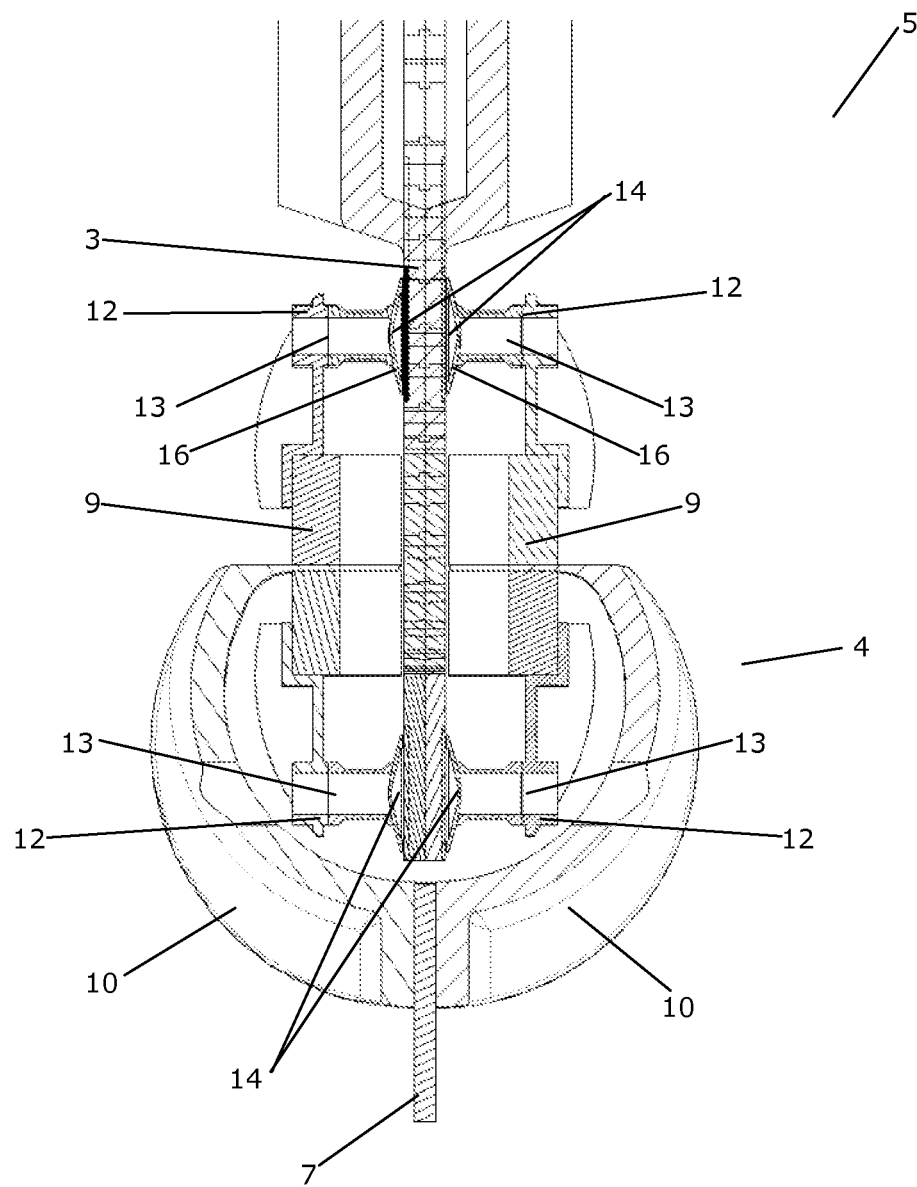
FIG. 5 is a cross sectional view of a generator comprising the stator of FIG. 2.

FIG. 5 is a cross sectional view of a generator 5 comprising the stator 4 of FIG. 2. In FIG. 5 the rotor 3 is arranged in the passage defined between the flux-generating modules 9 of the stator 4. It is also clear from FIG. 5 that the air gap defined between the rotor 3 and the flux-generating modules 9 is very small.

In FIG. 5 the shape of the stator support parts 10 can be clearly seen. Each stator support part 10 has a curved shape. The material thickness is thickest at the position where the stator support parts 10 are mounted on the stator frame 7, and decreases gradually along the curved shape in a direction away from the mounting point. Thereby the stator support parts 10 are more flexible at a position close to the flux-generating modules 9 than at a position close to the stator frame 7. Furthermore, the curved shape is designed in a manner which minimises strain introduced in the stator support part 10 during operation of the generator. The shape of the stator support part 10 is carefully selected in such a manner that a preloaded spring force is provided which acts against magnetic forces occurring between the rotor 3 and the flux-generating modules 9. More particularly, the magnetic forces occurring between the rotor 3 and the flux-generating modules 9 will tend to pull the flux-generating modules 9 towards the rotor 3. The shape of the stator support part 10 is designed in such a manner that this is automatically and passively counteracted by the stator support part 10.

The flux-generating modules 9 are mounted on the stator support parts 10 in such a manner that a contact point between a stator support part 10 and the corresponding flux-generating module 9 is positioned substantially halfway between an upper edge and a lower edge of the flux-generating module 9, i.e. approximately in a centre region of the flux-generating module 9. Furthermore, the shape of the stator support part 10 near this contact point is designed in such a manner that forces transferred between the stator support part 10 and the flux-generating module 9 are transferred along a direction which is substantially perpendicular to a radial direction defined by the rotor 3, as well as to the moving direction of the rotor 3. Thereby it is obtained that forces transferred between the stator support part 10 and the flux-generating module 9 will not tend to 'tilt' the flux-generating module 9, thereby creating a variation in the size of the air gap defined between the rotor 3 and the flux-generating module 9 along the radial direction. Instead it is ensured that the entire flux-generating module 9 is moved substantially along a direction towards or away from the rotor 3, thereby ensuring a uniform air gap between the rotor and the flux-generating modules 9.

Four bearing units 12 are visible. Each bearing unit 12 includes a body 16 defining a cavity 14 with an open end facing the rotor 3. A source of pressurized fluid (not shown) is connected to each bearing unit 12, whose bodies 16 direct the fluid against the rotor 3 thereby creating a fluid film between the cavities 14 and the rotor 3. The fluid film helps in maintaining a uniform air gap between the active material of the rotor 3 and the flux-generating modules 9. In the bearing units 12 shown in FIGS. 2-5, the cavity 14 of each bearing unit 12 is fixedly connected to a fluid passage 13 guiding pressurized fluid from the source of pressurized fluid to the cavity 14.

The invention claimed is:

1. A generator for a wind turbine, the generator comprising:
    a rotor configured to rotate about a rotational axis, and
    at least one stator arranged next to the rotor, each stator comprising at least two subunits, the subunits being arranged side-by-side along a moving direction of the rotor, each subunit comprising:
        separate stator support parts connected to each other via a hinge connection; and
        at least one flux-generating module mounted to at least one of the stator support parts and facing the rotor but spaced therefrom,
    wherein the subunits are movable relative to each other.

2. The generator according to claim 1, wherein each subunit further comprises a first flux-generating module and a second flux-generating module mounted to respective stator support parts arranged on opposing sides of the rotor.

3. A method of performing service on the generator according to claim 2, the method comprising:
    fixating the first flux-generating module of a first subunit,
    moving the second flux-generating module of the first subunit relative to the first
flux-generating module, via the hinge connection, thereby providing access to a region between the flux-generating modules and the rotor, and
    performing service on the generator, via the provided access.

4. The method according to claim 3, wherein the step of fixating the first flux-generating module comprises fixating the first flux-generating module to a second subunit.

5. The method according to claim 3, further comprising the step of releasing a connection between the first flux-generating module and the second flux-generating module prior to the step of moving the second flux-generating module.

6. The generator according to claim 1, wherein one of the stator support parts of a subunit is configured to be fixed to a neighboring subunit or to a support during movements of the other stator support part of the subunit via the hinge connection.

7. The generator according to claim 1, wherein at least two subunits or two groups of subunits define electrically separated subgenerators.

8. The generator according to claim 1, wherein the subunits are passively movable relative to each other along the transverse direction.

9. The generator according to claim 8, wherein each subunit is mounted on a stator support structure, and wherein the relative movements of the subunits are provided by flexibility of the stator support structures.

10. The generator according to claim 1, wherein the generator comprises at least two stators arranged along separate angular segments of the rotor.

11. The generator according to claim 1, wherein the generator is an axial flux generator with an air gap between the flux-generating modules and the rotor extending substantially parallel to the rotational axis of the rotor.

12. A wind turbine comprising at least one generator according to claim 1.

13. The wind turbine according to claim 12, the wind turbine comprising two generators, the rotors of said generators being mounted on a common rotational shaft.

14. The wind turbine according to claim 12, wherein the rotor of the generator is connected to a set of wind turbine blades.

15. The wind turbine according to claim 12, the wind turbine being a horizontal axis wind turbine.

16. The wind turbine according to claim 12, wherein the generator is a direct drive generator.

* * * * *